US010554486B2

(12) United States Patent
Kaufman et al.

(10) Patent No.: US 10,554,486 B2
(45) Date of Patent: Feb. 4, 2020

(54) MULTI-ENROLLMENTS OF A COMPUTING DEVICE INTO CONFIGURATION SOURCES

(71) Applicant: Microsoft Corporation, Redmond, WA (US)

(72) Inventors: Peter J. Kaufman, Sammamish, WA (US); Richard Ivan June, Seattle, WA (US); Feng Yue, Sammamish, WA (US); Yuhang Zhu, Bellevue, WA (US); John Chadwell Spaith, Bellevue, WA (US); Justin Hou, Seattle, WA (US); Vladimir Holostov, Sammamish, WA (US); Javier Novales, Issaquah, WA (US); Sean Anderson Bowles, Seattle, WA (US); Janani Vasudevan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 14/498,198

(22) Filed: Sep. 26, 2014

(65) Prior Publication Data
US 2016/0094386 A1    Mar. 31, 2016

(51) Int. Cl.
G06F 15/177    (2006.01)
H04L 12/24    (2006.01)
H04L 29/06    (2006.01)

(52) U.S. Cl.
CPC ...... H04L 41/0806 (2013.01); H04L 41/0869 (2013.01); H04L 63/101 (2013.01)

(58) Field of Classification Search
CPC ............. H04L 41/0806; H04L 41/0869; H04L 63/101; G06F 9/44505
(Continued)

(56) References Cited

U.S. PATENT DOCUMENTS 5,519,878 A * 5/1996 Dolin, Jr. ............ H04L 12/2803
                                              709/220
5,838,918 A * 11/1998 Prager ................. H04L 41/0233
                                              709/221
(Continued)

OTHER PUBLICATIONS

"International Preliminary Report on Patentability for PCT Patent Application No. PCT/US2015/051567", dated Oct. 5, 2016, 20 pages.
(Continued)

Primary Examiner — John B Walsh
(74) Attorney, Agent, or Firm — Medley, Behrens & Lewis, LLC

(57) ABSTRACT

Various technologies described herein pertain to managing multiple enrollments of a computing device into configuration sources. Respective enrollment types for the enrollments into the configuration sources can be detected. Moreover, respective control data for the enrollments into the configuration sources can be set based on the enrollment types. Provisioning elements (e.g., policies, preferences, configuration profiles, and resources) that satisfy the respective control data can be permitted to be applied to the computing device by the configuration sources as part of the enrollments. Further, disparate provisioning elements that fail to satisfy the respective control data can be prevented from being applied to the computing device as part of the enrollments.

20 Claims, 8 Drawing Sheets

(58) Field of Classification Search
USPC .......................................................... 709/220
See application file for complete search history.

(56) References Cited

U.S. PATENT DOCUMENTS

| | | | | |
|---|---|---|---|---|
| 5,884,075 | A * | 3/1999 | Hester | G06F 9/4411 713/100 |
| 6,243,747 | B1 * | 6/2001 | Lewis | H04L 41/0843 709/220 |
| 6,275,805 | B1 * | 8/2001 | Fado | G10L 15/26 704/270 |
| 6,381,639 | B1 * | 4/2002 | Thebaut | G06F 21/30 709/221 |
| 6,735,691 | B1 * | 5/2004 | Capps | G06F 9/44505 713/1 |
| 7,366,460 | B2 * | 4/2008 | O'Farrell | G06Q 10/10 455/3.06 |
| 8,166,002 | B2 * | 4/2012 | Robinson | G06F 17/30348 707/616 |
| 8,375,136 | B2 * | 2/2013 | Roman | H04L 41/0213 709/220 |
| 8,943,229 | B2 * | 1/2015 | 't Hooft | G06F 1/1632 710/8 |
| 9,065,863 | B1 * | 6/2015 | Tharakan | H04L 63/10 |
| 9,265,022 | B2 * | 2/2016 | Gupta | H04W 8/04 |
| 2002/0112187 | A1 * | 8/2002 | Dalton, Jr. | H04L 29/06027 726/14 |
| 2003/0182403 | A1 * | 9/2003 | de Bonet | H04L 12/6418 709/220 |
| 2005/0114474 | A1 * | 5/2005 | Anderson | H04L 41/0213 709/220 |
| 2007/0130617 | A1 * | 6/2007 | Durfee | G06F 21/33 726/5 |
| 2007/0198664 | A1 * | 8/2007 | Satkunanathan | H04L 41/0806 709/220 |
| 2008/0140868 | A1 * | 6/2008 | Kalayjian | G06F 1/1698 710/8 |
| 2010/0313245 | A1 * | 12/2010 | Brandt | G06F 21/33 726/4 |
| 2011/0252240 | A1 * | 10/2011 | Freedman | H04L 63/02 713/169 |
| 2012/0016861 | A1 * | 1/2012 | Edwards | G06F 17/30023 707/707 |
| 2012/0083305 | A1 * | 4/2012 | Alexander | H04L 12/2816 455/507 |
| 2012/0331088 | A1 * | 12/2012 | O'Hare | G06F 21/6227 709/214 |
| 2013/0007245 | A1 * | 1/2013 | Malik | H04L 41/0816 709/223 |
| 2013/0191765 | A1 * | 7/2013 | Andersson Reimer | G06F 3/0488 715/762 |
| 2013/0318220 | A2 * | 11/2013 | Ardiri | H04W 8/186 709/223 |
| 2014/0024339 | A1 * | 1/2014 | Dabbiere | H04M 15/885 455/406 |
| 2014/0066015 | A1 * | 3/2014 | Aissi | H04W 12/06 455/411 |
| 2014/0282839 | A1 * | 9/2014 | Cai | H04L 63/08 726/1 |
| 2015/0096005 | A1 * | 4/2015 | Martini | H04L 63/102 726/8 |
| 2015/0304358 | A1 * | 10/2015 | Brannon | G06F 21/60 726/1 |

OTHER PUBLICATIONS

"Written Opinion for PCT Patent Application No. PCT/US2015/051567", dated Jul. 20, 2016, 7 pages.
"Response to the International Search Report and Written Opinion for PCT Patent Application No. PCT/US2015/051567", Filed Date: Mar. 11, 2016, 16 pages.
"Reconciliation Rules for Conflicting Settings in Software Configurations", Retrieved at: <<http://docs.blackberry.com/en/admin/deliverables/25767/Reconciliation_rules_for_sw_configs_607146_11.jsp>>, Feb. 2, 2013, 11 Pages.
"How to Manage Clients in Configuration Manager", Retrieved at: <<http://technet.microsoft.com/en-us/library/gg712288.aspx>>, Aug. 1, 2012, 10 Pages.
Capra, et al., "CARISMA: Context-Aware Reflective Middleware System for Mobile Applications", In IEEE Transactions on Software Engineering, vol. 29, Issue 10, Oct. 2003, 17 pages.
International Search Report and Written Opinion for PCT Patent Application No. PCT/US2015/051567, dated Dec. 7, 2015, 11 pages.
"Office Action Issued in European Patent Application No. 15775871.5", dated Mar. 6, 2018, 4 Pages.

* cited by examiner

MULTI-ENROLLMENTS OF A COMPUTING DEVICE INTO CONFIGURATION SOURCES

BACKGROUND

Computing devices oftentimes enroll in configuration sources. When a computing device is enrolled in a configuration source, the configuration source can administer the computing device. The configuration source can distribute provisioning elements to the computing device. The provisioning elements can include policies, preferences, configuration profiles, and resources that can be applied to the computing device as part of the enrollment in the configuration source. The provisioning elements applied to the computing device by the configuration source, for instance, can control and protect data and configuration settings for the computing device.

SUMMARY

Described herein are various technologies that pertain to managing multiple enrollments of a computing device into configuration sources. A centralized enrollment system can be configured to enroll the computing device into the configuration sources. The centralized enrollment system can be configured to detect a first enrollment type for a first enrollment into a first configuration source and a second enrollment type for a second enrollment into a second configuration source. Moreover, first control data for the first enrollment into the first configuration source can be set. The first control data can be set based at least on the first enrollment type. The computing device can be enrolled into the first configuration source using the first control data. Further, second control data for the second enrollment into the second configuration source can be set. The second control data can be set based at least on the second enrollment type. The computing device can be enrolled into the second configuration source using the second control data. First provisioning elements that satisfy the first control data can be permitted to be applied to the computing device by the first configuration source as part of the first enrollment and second provisioning elements that satisfy the second control data can be permitted to be applied to the computing device by the second configuration source as part of the second enrollment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
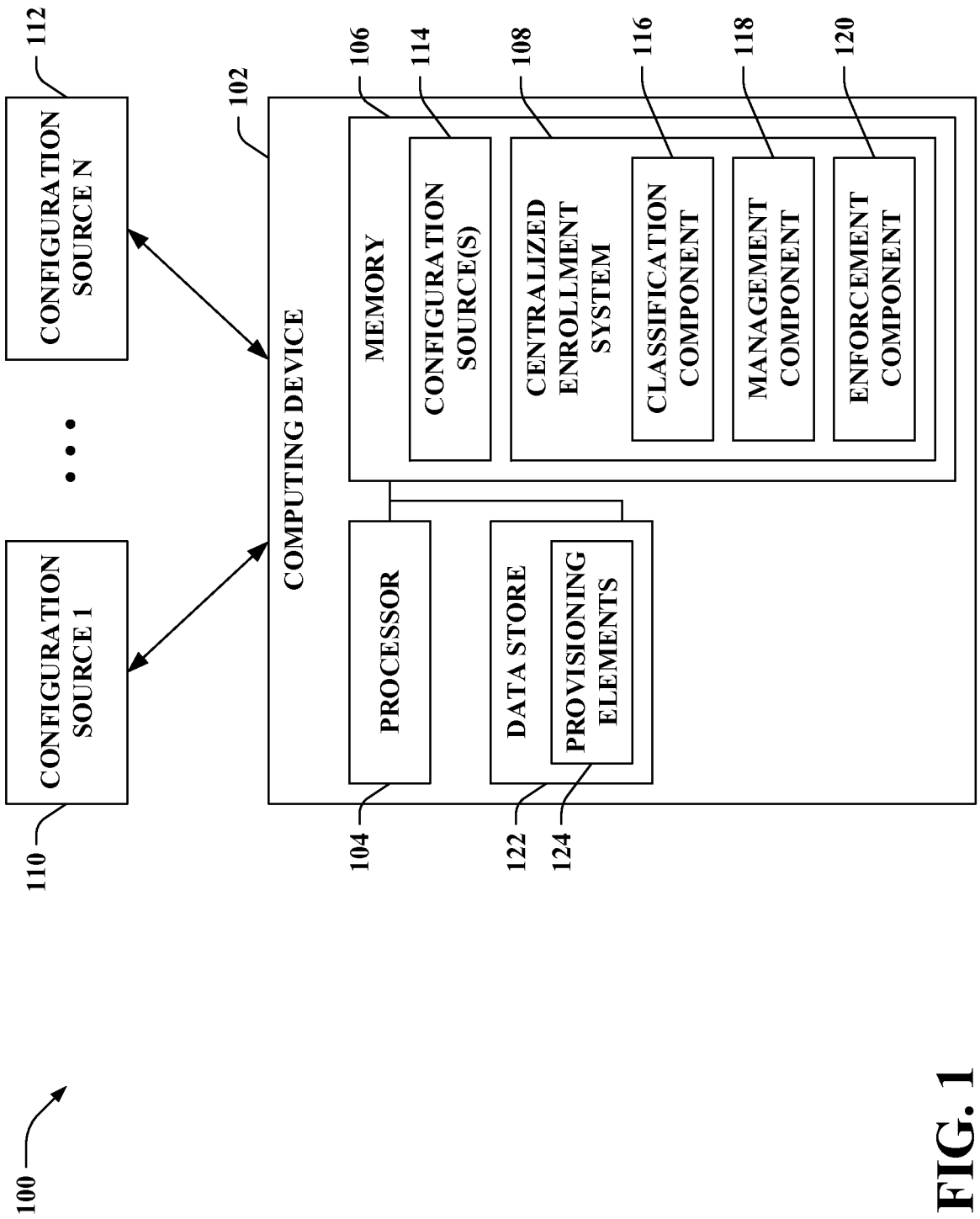
FIG. 1 illustrates a functional block diagram of an exemplary system that includes a computing device that enrolls into multiple configuration sources.

Various technologies pertaining to managing multiple enrollments of a computing device into configuration sources are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that includes a computing device 102 that enrolls into multiple configuration sources. The computing device 102 includes at least one processor 104 and memory 106. The processor 104 described herein can include one or more processors and/or one or more processor cores. The processor 104 is configured to execute instructions loaded into the memory 106 (e.g., one or more systems loaded into the memory 106 are executable by the processor 104, one or more components loaded into the memory 106 are executable by the processor 104, etc.). As described in greater detail herein, the memory 106 includes a centralized enrollment system 108 that is configured to enroll the computing device 102 into configuration sources. Thus, the centralized enrollment system 108 is executable by the processor 104.

Various types of computing devices are intended to fall within the scope of the hereto appended claims. The computing device 102 can be a mobile computing device. Examples of a mobile computing device include a laptop computing device, a mobile telephone (e.g., smartphone), a tablet computing device, a wearable computing device, a handheld computing device, a portable gaming device, a personal digital assistant, a portable all-in-one computing device, or the like. Further, the computing device 102 can be a desktop computing device, a gaming console, an embedded computing device (e.g., connectible via the Internet of Things (IoT)), and so forth.

The centralized enrollment system 108 enables the computing device 102 to enroll into multiple configuration sources. The centralized enrollment system 108 provides a unified model for enrollment into the configuration sources. The centralized enrollment system 108 can enable the computing device 102 to enroll into one or more external configuration sources, namely, a configuration source 1 110, . . . , and a configuration source N 112 (collectively referred to herein as configuration sources 110-112), where N can be substantially any integer greater than one. Yet, according to various examples, it is contemplated that the computing device 102 can enroll into zero or one external configuration source. The centralized enrollment system 108 can additionally or alternatively enable the computing device 102 to enroll into one or more internal configuration source(s) 114. A set of configuration sources into which the computing device 102 is enrolled, including the configuration sources 110-112 and the configuration source(s) 114, is collectively referred to herein as configuration sources 110-114.

The centralized enrollment system 108 can enable the computing device 102 to concurrently enroll into two or more configuration sources 110-114; however, at various times, the computing device 102 may be enrolled in zero or one configuration source 110-114. Further, the centralized enrollment system 108 can allow the computing device 102 to enroll into and/or unenroll from configuration source(s). For example, the computing device 102 can be enrolled into one or more configuration sources at a given time; following this example, the centralized enrollment system 108 can enable the computing device 102 to subsequently be enrolled into a differing configuration source. The computing device 102 can be enrolled into the differing configuration source without unenrolling from the one or more configuration sources into which the computing device 102 was previously enrolled. However, as described in greater detail below, it is to be appreciated that the computing device 102 alternatively may be unenrolled from at least one of the one or more configuration sources into which the computing device 102 was previously enrolled in response to enrolling into the differing configuration source (e.g., responsive to identification of a conflict between enrollment types). Pursuant to yet another example, the computing device 102 can be enrolled into one or more configuration sources at a given time, and the centralized enrollment system 108 can enable the computing device 102 to subsequently be unenrolled from at least one of the one or more configuration sources into which the computing device 102 was previously enrolled.

Various kinds of configuration sources are intended to fall within the scope of the hereto appended claims. For example, the configuration sources 110-112 can include one or more mobile device management (MDM) servers, one or more messaging servers (e.g., a messaging server can synchronize email, contacts, calendar, tasks, notes, etc. with the computing device 102), one or more classroom orchestration servers, a mobile operator, and so forth. By way of illustration, the configuration source 1 110 can be a first MDM server, the configuration source N 112 can be a second MDM server, and the first MDM server and the second MDM server can be different servers. Following this illustration, the centralized enrollment system 108 can enable the computing device 102 to concurrently enroll into the two MDM servers (or more than two MDM servers). It is further contemplated that the centralized enrollment system 108 can also enable the computing device 102 to concurrently enroll into other configuration source(s) in addition to the two (or more) MDM servers. Yet, the claimed subject matter is not limited to the foregoing illustration.

Moreover, the memory 106 can include one or more internal configuration source(s) 114. The configuration source(s) 114 can include a provisioning package (or a plurality of provisioning packages); thus, the memory 106 can include the provisioning package(s). A provisioning package can be executed by the processor 104 of the computing device 102, and the computing device 102 can enroll into the provisioning package (e.g., the provisioning package can configure the computing device 102 as part of the enrollment). The provisioning package can include commands, which can be processed and validated. The provisioning package can include provisioning elements (e.g., policies, preferences, configuration profiles, resources); further, provisioning elements provided by the provisioning package can be applied by the centralized enrollment system 108. Pursuant to an example, a provisioning package can be an XML file; yet, other formats other than an XML file are intended to fall within the scope of the hereto appended claims.

The computing device 102 can receive a provisioning package. The provisioning package can be received via email; yet, it is contemplated that other manners of delivering the provisioning package to the computing device 102 are intended to fall within the scope of the hereto appended claims (e.g., the provisioning package can be received wirelessly from a differing computing device, via download, via a removable storage medium coupled with the computing device 102, etc.). It is also contemplated that the provisioning package can be preloaded on the computing device 102 (e.g., retained in a data store 122 of the computing device 102, etc.). Responsive to input signifying selection of the provisioning package (e.g., an icon indicative of the provisioning package being selected by way of a graphical user interface, etc.), the provisioning package can be executed, for example. By way of another example, execution of the provisioning package can be automatically initiated in response to receipt of the provisioning package. Moreover, if the provisioning package is removed from the computing device 102, provisioning elements applied by the provisioning package can be cleaned up (e.g., by a removal component as described herein).

The centralized enrollment system 108 includes a classification component 116 configured to detect respective enrollment types for enrollments into the configuration sources 110-114. Responsive to initiation of an enrollment into one of the configuration sources 110-114, the classification component 116 can detect an enrollment type for the enrollment into such configuration source. Accordingly, the classification component 116 can be configured to detect a first enrollment type for a first enrollment into a first configuration source and a second enrollment type for a second enrollment into a second configuration source (e.g., the configuration sources 110-114 can include at least the first configuration source and the second configuration source). While many of the examples set forth herein describe enrolling to a first configuration source and a second configuration source, it is to be appreciated that these examples can be extended to enrolling into more than two configuration sources. Moreover, the terms "first", "second", "third", and the like are not used herein to connote an order; rather, these terms are used for identification purposes (e.g., to identify differing configuration sources, etc.).

The centralized enrollment system 108 can further include a management component 118 configured to set respective control data for the enrollments into the configuration sources 110-114 based at least on the enrollment types. For instance, the management component 118 can set first control data for the first enrollment into the first configuration source and second control data for the second enrollment into the second configuration source. The first control data can be set by the management component 118 based at least on the first enrollment type, where the computing device 102 is to be enrolled into the first configuration source using the first control data. Likewise, the second control data can be set by the management component 118 based at least on the second enrollment type, where the computing device 102 is to be enrolled into the second configuration source using the second control data.

The control data can include various metadata associated with the enrollments. The metadata can be set by the management component 118 based on the enrollment type detected by the classification component 116. Further, the metadata can be utilized when enrolling and/or unenrolling the configuration sources 110-114. The centralized enrollment system 108 can provide guidelines and rules managing how components interact with the enrollments into the configuration sources 110-114.

According to an example, the control data can include scopes for the enrollments into the configuration source 110-114. Following this example, the first control data set by the management component 118 based on the first enrollment type can include a first scope for the first enrollment into the first configuration source. The first scope can specify first permissible provisioning elements allowed to be applied by the first configuration source as part of the first enrollment. Moreover, the second control data set by the management component 118 based on the second enrollment type can include a second scope for the second enrollment into the second configuration source. The second scope can specify second permissible provisioning elements allowed to be applied by the second configuration source as part of the second enrollment.

The permissible provisioning elements can include policies, preferences, configuration profiles, and resources that are permissible for a configuration source to apply to the computing device 102 as part of an enrollment. When configured on the computing device 102, a policy can control a default setting. A default setting value provided by the policy may be unable to be overridden (e.g., by a user of the computing device 102); yet, according to an example described below, it is contemplated that the default setting may be overridden responsive to a configuration source request. Further, a preference can control a preferred value for a setting; the preferred value, however, may be altered (e.g., by a user of the computing device 102). Moreover, the resources can include applications, data, and so forth provided by the configuration source as part of the enrollment.

According to another example, the control data can include authorization data for the configuration sources 110-114. Following this example, the first control data set by the management component 118 based on the first enrollment type can include first authorization data for the first enrollment into the first configuration source. The first authorization data can specify first access rights for the first configuration source as part of the first enrollment. Moreover, the second control data set by the management component 118 based on the second enrollment type can include second authorization data for the second enrollment into the second configuration source. The second authorization data can specify second access rights for the second configuration source as part of the second enrollment. Access rights specified as part of the authorization data for an enrollment can specify read-write access rights for a configuration source. Moreover, access rights specified as part of the authorization data for an enrollment can include a list of uniform resource identifiers (URIs) that identify resources that are allowed to come through to the computing device 102 as part of the enrollment.

Pursuant to another example, the control data can include security data for the enrollments into the configuration sources 110-114. Security data for an enrollment into a configuration source, for instance, can specify protocols to be utilized to exchange data as part of the enrollment (e.g., for exchanging data between the configuration source and the computing device 102). For instance, the security data can specify a type of encryption to be utilized to exchange data. By way of illustration, the first control data set by the management component 118 based on the first enrollment type can include security data that specifies a first security protocol for the first enrollment into the first configuration source. Further, the second control data set by the management component 118 based on the second enrollment type can include second security data that specifies a second security protocol for the second enrollment into the second configuration source.

The centralized enrollment system 108 can further include an enforcement component 120 configured to permit provisioning elements 124 (e.g., policies, preferences, configuration profiles, resources) that satisfy the respective control data to be applied to the computing device 102 by the configuration sources 110-114 as part of the enrollments. Moreover, the enforcement component 120 can prevent disparate provisioning elements from the configuration sources 110-114 that fail to satisfy the respective control data from being applied as part of the enrollments. Thus, the enforcement component 120 can selectively allow or prevent provisioning elements from the configuration sources 110-114 to be set on the computing device 102 based on the type of the configuration source. The enforcement component 120 can cause the configuration sources 110-114 to comply with the respective control data corresponding to the enrollment types and can validate that the configuration sources 110-114 have authority to apply provisioning elements. Accordingly, if a configuration source does not comply with corresponding control data during an enrollment, then the enforcement component 120 can return an error to the configuration source.

The computing device 102 can include a data store 122. Further, the provisioning elements 124 permitted to be applied to the computing device 102 by the enforcement component 120 can be retained in the data store 122. Further, the centralized enrollment system 108 can provide an interface to enrollment data including enrollment type, which can allow components executed by the computing device 102 to make enforcement decisions on the provisioning elements 124.

According to an illustration, the enforcement component 120 can permit first provisioning elements that satisfy the first control data to be applied to the computing device 102 by the first configuration source as part of the first enrollment. Moreover, the enforcement component 120 can permit second provisioning elements that satisfy the second control data to be applied to the computing device 102 by the second configuration source as part of the second enrollment. The enforcement component 120 can further prevent disparate provisioning elements from the first configuration source that fail to satisfy the first control data from being applied as part of the first enrollment and disparate second provisioning elements from the second configuration source that fail to satisfy the second control data from being applied as part of the second enrollment.

Pursuant to another example, a high privilege configuration source (e.g., one of the configuration sources 110-114) can send a policy to the computing device 102 specifying types of configuration sources that can set types of provisioning elements. Such policy can be utilized by the enforcement component 120, for instance, when determining whether to permit or prevent a provisioning element from being applied by a given configuration source. Yet, the claimed subject matter is not limited to use of a high privilege configuration source.

Below are various examples of enrollment types. It is contemplated that the exemplary enrollment types are provided for illustration purposes, and the claimed subject matter is not limited to these enrollment types. For instance, the centralized enrollment system 108 can be extensible, thereby allowing additional enrollment types to be defined. Moreover, the centralized enrollment system 108 may lack one or more of the following enrollment types.

An example of an enrollment type is a full enrollment. As part of the full enrollment, a configuration source can enroll the computing device 102 at a system level. Thus, the configuration source can manage user accounts on the computing device 102 as well as the computing device 102 in general as part of the enrollment.

Another example of an enrollment type is a light enrollment. In a light enrollment, a particular end user account (other than an administrator) can enroll the computing device 102 into a configuration source.

Another example of an enrollment type supported by the configuration sources 110-112 (e.g., the external configuration sources) is an on-device enrollment type. When employing the on-device enrollment type, an external configuration source can send a provisioning package to the computing device 102. The provisioning package can be executed by the processor 104 of the computing device 102 as part of the enrollment.

Further, the centralized enrollment system 108 can be extensible. Thus, the centralized enrollment system 108 can support additional enrollment types being defined, each having corresponding control data. As part of the development model for the enrollment types, it is contemplated that one enrollment type can inherit from a different enrollment type (e.g., a specialized enrollment type can inherit rules from a base enrollment type).

Moreover, it is to be appreciated that a configuration source may support more than one enrollment type. For instance, an MDM server can support full enrollment, light enrollment, and on-device enrollment. Thus, a configuration source can select provisioning elements to apply to the computing device 102 based on the enrollment type used for an enrollment into such configuration source.

Figure 2:
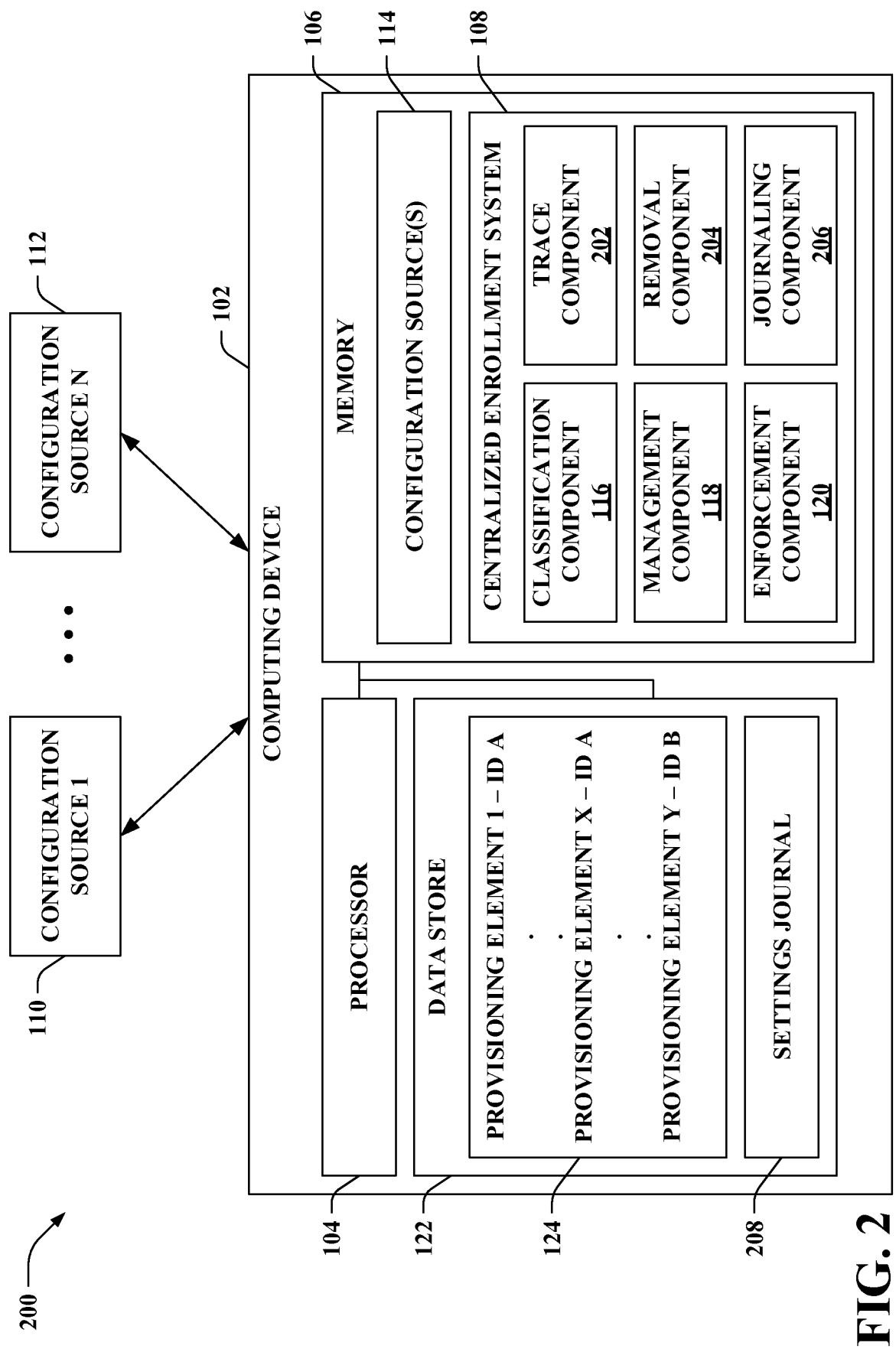
FIG. 2 illustrates a functional block diagram of an exemplary system that tracks provisioning elements applied to the computing device.

Turning to FIG. 2, illustrated is a system 200 that tracks the provisioning elements 124 applied to the computing device 102. The centralized enrollment system 108 of the computing device 102 can enable the computing device 102 to enroll into multiple configuration sources 110-114, partitioning each into the data store 122. Moreover, the centralized enrollment system 108 can track the provisioning elements 124 back to the configuration sources 110-114 that respectively provisioned each of the provisioning elements 124.

As described above, the enforcement component 120 can permit the first provisioning elements that satisfy the first control data to be applied to the computing device 102 by the first configuration source and the second provisioning elements that satisfy the second control data to be applied to the computing device 102 by the second configuration source. The data store 122 can retain the first provisioning elements applied to the computing device 102 by the first configuration source and the second provisioning elements applied to the computing device 102 by the second configuration source. The centralized enrollment system 108 can further include a trace component 202 configured to track each provisioning element applied to the computing device 102 to a corresponding one of the configuration sources 110-114 that provisioned the provisioning element. Thus, the trace component 202 can track the first provisioning elements to have been provisioned by the first configuration source and the second provisioning elements to have been provisioned by the second configuration source. Accordingly, the trace component 202 provides a mechanism to track policies, preferences, configuration profiles, and resources back to the configuration sources 110-114 that respectively applied such provisioning elements 124.

When a configuration source pushes a provisioning element onto the computing device 102, the trace component 202 can retain the provisioning element along with an identifier indicative of the configuration source in the data store 122. The data store 122, for instance, can be partitioned based on configuration source identifier. An identifier can be a unique enrollment identifier generated on the computing device 102 for a corresponding configuration source. As depicted in FIG. 2, a provisioning element 1 can be associated with an identifier A, a provisioning element X can be associated with an identifier A, a provisioning element Y can be associated with an identifier B, and so forth. Accordingly, a subset of the provisioning elements 124 set by a given one of the configuration sources 110-114 can be determined based on the identifiers corresponding to the provisioning elements 124 (e.g., the provisioning element 1 and the provisioning element X can both be determined as having been provisioned by a configuration source identified by identifier A).

The centralized enrollment system 108 can further include a removal component 204 configured to unenroll the computing device 102 from a configuration source (e.g., one or more of the configuration sources 110-114) subsequent to the computing device 102 being enrolled in such configuration source. Moreover, the removal component 204 can be configured to remove, in response to unenrolling the computing device 102 from the configuration source, the provisioning elements tracked to have been provisioned by the configuration source from the data store 122. Thus, the centralized enrollment system 108 uses this tracking to roll back the policies, preferences, configuration profiles, and resources in response to unenrollment from the configuration source. For instance, the removal component 204 can use the identifiers indicative of the configuration sources 110-114 that respectively applied the provisioning elements 124 to detect provisioning elements to be rolled back in response to unenrollment.

Moreover, the centralized enrollment system 108 can optionally include a journaling component 206. The journaling component 206 can log settings pushed from the configuration sources 110-114 in a settings journal 208, which can be retained in the data store 122. The journaling component 206 can further purge a subset of the settings configured by a particular one of the configuration sources 110-114 from the settings journal 208 in response to the computing device 102 no longer being enrolled into the particular one of the configuration sources 110-114. Thereafter, the journaling component 206 can configure a state of the computing device 102 based on a remainder of the settings in the settings journal 208. For instance, the settings from one of the configuration sources 110-114 may no longer apply to the computing device 102 when unenrolled from such configuration source. Thus, the journaling component 206 can replay the settings of the cleaned-up settings journal 208 to obtain the state of the settings for the computing device 102.

Figure 3:
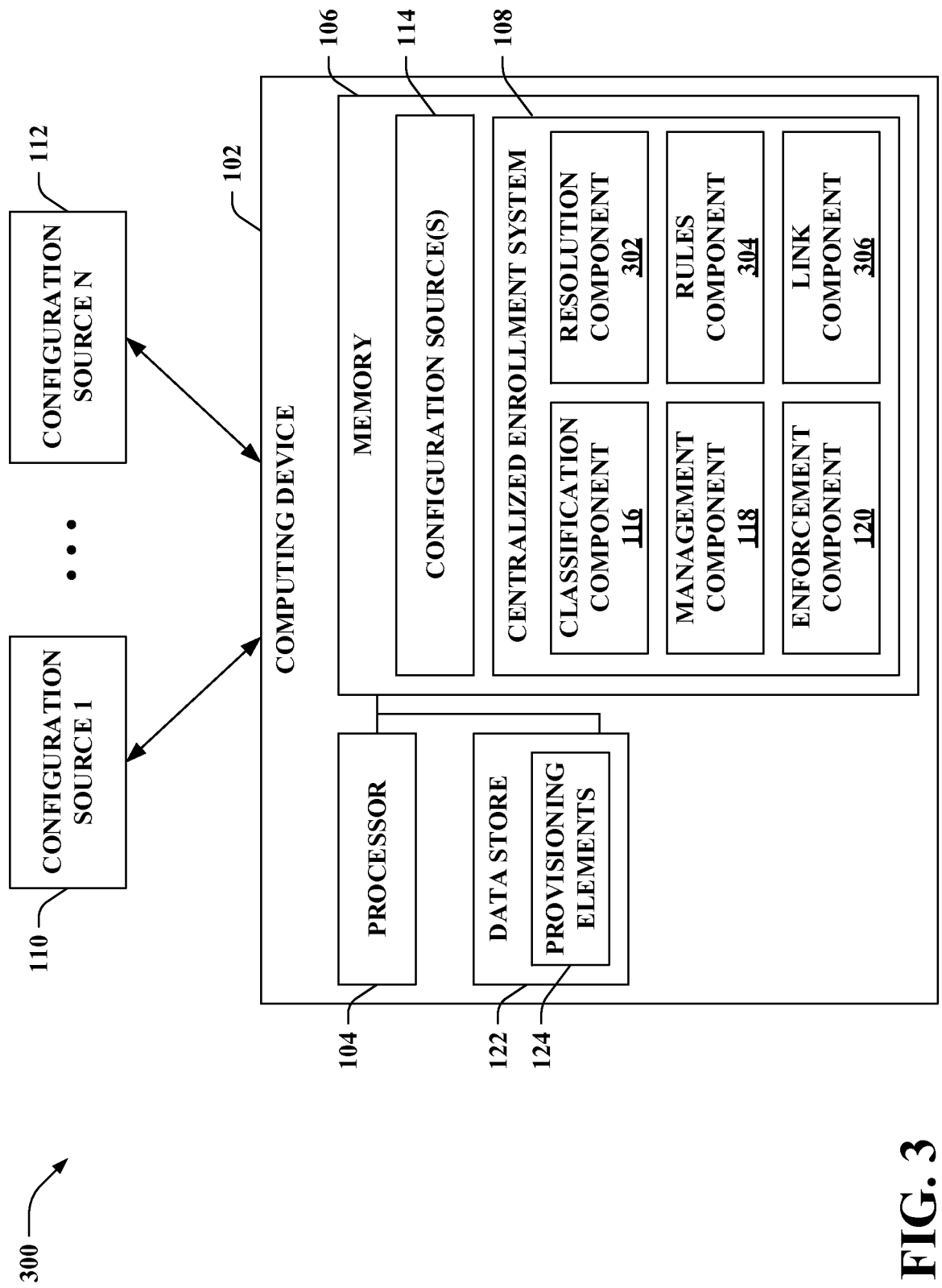
FIG. 3 illustrates a functional block diagram of an exemplary system that manages multiple enrollments of the computing device into the configuration sources.

With reference to FIG. 3, illustrated is a system 300 that manages multiple enrollments of the computing device 102 into the configuration sources 110-114. Again, the computing device 102 includes the centralized enrollment system 108. The centralized enrollment system 108 can include the classification component 116, the management component 118, and the enforcement component 120. Moreover, although not shown, is to be appreciated that the centralized enrollment system 108 can further include the trace component 202, the removal component 204 and/or the journaling component 206.

The centralized enrollment system 108 can further include a resolution component 302 configured to detect conflicting provisioning elements applied by differing configuration sources (e.g., two or more of the configuration sources 110-114. The resolution component 302 can merge the conflicting provisioning elements applied by the differing configuration sources. For instance, the resolution component 302 can merge conflicting provisioning elements applied by a first configuration source and a second configuration source. Over a lifetime of a relationship between the computing device 102 and a configuration source, provisioning elements may be attempted to be added to, modified in, and removed from the data store 122 by the configuration source. The centralized enrollment system 108 can utilize classifications of the configuration sources 110-114 (e.g., the enrollment types for the enrollments into the configuration sources 110-114) as determined by the classification component 116 to determine whether the configuration sources 110-114 respectively have authority to apply such changes to the provisioning elements 124 retained in the data store 122. If the enforcement component 120 permits the provisioning elements to be applied, then the resolution component 302 may resolve conflicts between provisioning elements applied by differing configuration sources utilizing one or more merge conflict algorithms for each addition, modification, or deletion of a provisioning element. According to an example, a merge conflict algorithm can cause a most secure setting to be selected by the resolution component 302 when the provisioning elements 124 include conflicting policies. Thus, given that there are groups of policies, preferences, configuration profiles, and resources, each from differing configuration sources, there may be conflicts between such provisioning elements set by the differing configuration sources, and the resolution component 302 can resolve such conflicts by following a given merge conflict algorithm (or algorithms). It is contemplated that the resolution component 302 can be extensible to support additional merge conflict algorithms. Moreover, responsive to the computing device 102 unenrolling from one of the configuration sources 110-114, the resolution component 302 can re-evaluate the provisioning elements 124 for the remaining configuration sources 110-114.

The centralized enrollment system 108 can further include a rules component 304. The rules component 304 can analyze interactions between enrollment types of the configuration sources 110-114 (as well as configuration source(s) into which the computing device 102 is desirably enrolled). A conflict between enrollment types can be identified by the rules component 304. Responsive to identification of the conflict, the rules component 304 can perform an action. The action can include at least one of triggering unenrollment of the computing device 102 from a configuration source or preventing an enrollment into a configuration source. For example, responsive to identification of a conflict between a first enrollment type for a first enrollment into a first configuration source and a second enrollment type for a second enrollment into a second configuration source, the rules component 304 can prevent the computing device 102 from maintaining both the first enrollment into the first configuration source and the second enrollment into the second configuration source. The rules component 304 can prevent the computing device 102 from maintaining both the first enrollment and the second enrollment by unrolling the computing device 102 from at least one of the first configuration source or the second configuration source. Additionally or alternatively, the rules component 304 can prevent the computing device 102 from maintaining both the first enrollment and the second enrollment by preventing an enrollment into the first configuration source or the second configuration source.

Responsive to identification of the conflict, the rules component 304 can automatically enroll the computing device 102 in a configuration source that has a higher priority enrollment type relative to an enrollment type of a differing configuration source, for example. By way of another example, the rules component 304 can cause a prompt to be output via the computing device 102 (e.g., displayed on a display screen, audio output, haptic feedback, etc.) in response to identification of the conflict; responsive to the prompt, an input that specifies a selection of a configuration source in which to unenroll (or enroll) the computing device 102 can be received.

By way of illustration, the rules component 304 can prevent the computing device 102 from concurrently being enrolled into a messaging server with full enrollment and an MDM server with light enrollment. Thus, such scenario can be detected to be a conflict by the rules component 304. However, it is to be appreciated that the claimed subject matter is not limited to this illustration, as substantially any other scenario can be defined as a conflict for the rules component 304 and/or the foregoing scenario need not be defined as a conflict.

The centralized enrollment system 108 can further include a link component 306 configured to link a first enrollment into a first configuration sources to a second enrollment into a second configuration source. The first enrollment can be indicated as a parent enrollment and the second enrollment can be indicated as a child enrollment. The link component 306 can trigger unenrollment of the computing device 102 from the second configuration source in response to unenrollment of the computing device 102 from the first configuration source. The link component 306 provides a mechanism to allow an enrollment to express children enrollment(s) or dependent enrollment(s). Accordingly, the centralized enrollment system 108 supports a hierarchy of enrollments, allowing a parent enrollment to link to one or more children enrollments. The foregoing can allow the parent enrollment to configure the computing device 102 with provisioning elements that span lifetime(s) of the children enrollment(s). With the hierarchy support, unenrolling a parent enrollment causes the children enrollment(s) to unenroll during cleanup (e.g., via the removal component 204).

Figure 4:
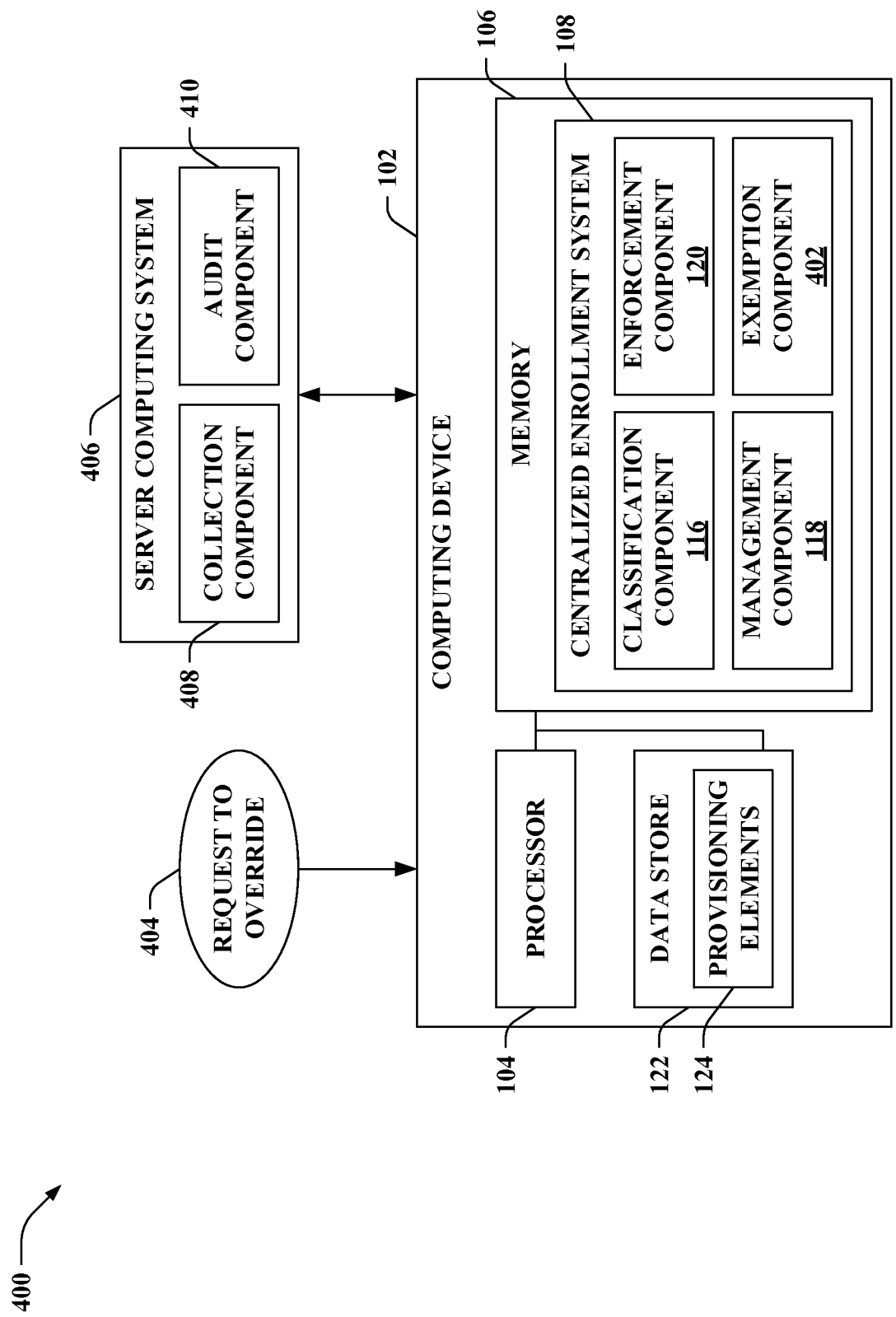
FIG. 4 illustrates a functional block diagram of an exemplary system that enables overriding policies set by the configuration sources.

Referring now to FIG. 4, illustrated is a system 400 that enables overriding policies set by the configuration sources 110-114. The computing device 102 includes the centralized enrollment system 108, which can include the classification component 116, the management component 118, and the enforcement component 120. Further, it is contemplated that the centralized enrollment system 108 can further include the trace component 202, the removal component 204, the journaling component 206, the resolution component 302, the rules component 304 and/or the link component 306.

The centralized enrollment system 108 can further include an exemption component 402 configured to receive a request 404 to override a setting configured by one or more of the provisioning elements 124 (e.g., applied by one or more of the configuration sources 110-114). The exemption component 402 can log information indicative of the request 404. For instance, the exemption component 402 can log information including a user identifier, a justification for overriding the setting, an identifier that specifies the setting, and so forth. Moreover, a timestamp may be recorded by the exemption component 402 corresponding to a time at which the request 404 is received. The exemption component 402 can further override the setting based on the request 404. For example, the setting can automatically be overridden by the exemption component 402 in response to receipt of the request 404. According to another example, the setting can be overridden at a later time (relative to a time of receipt of the request 404) responsive to the request 404 being reviewed and accepted.

The exemption component 402 can further transmit the information indicative of the request 404 to a server computing system 406. The server computing system 406 can include a collection component 408 configured to collect the information indicative of the request 404 from the computing device 102. The collection component 408 can also collect information indicative of disparate requests from the computing device 102 as well as information indicative of other requests from differing computing devices. Moreover, the server computing system 406 can include an audit component 410 configured to audit the information obtained by the collection component 408. The audit component 410, for instance, can generate statistics pertaining to overrides of settings, thereby enabling evaluation into why overrides are requested.

Various policies can control overriding a setting by the exemption component 402. According to an example of a policy, if a network connection is available to the computing device 102, then a user of the computing device 102 can be permitted to initiate an override via the request 404 since it is expected that the information indicative of the request can reach the server computing system 406 for auditing by the audit component 410. Following this example, if no network connectivity is available to the computing device 102, then user initiated overrides can be forbidden. By way another example of a policy, the exemption component 402 can be set to require explicit agreement on an override of a setting from the server computing system 406 prior to overriding the setting. Pursuant to yet another example of a policy, the exemption component 402 can be set to log the information indicative of the request 404 and transmit such information to the server computing system 406 for auditing (e.g., without overriding the setting).

By way of illustration, a configuration source may modify the behavior of the computing device 102. Yet, a user of the computing device 102 may have reason to contravene such behavior. By way of illustration, a configuration source may have disabled a camera of the computing device 102, yet the user of the computing device 102 may have reason to turn the camera on. Accordingly, a request to turn the camera on can be provided to the exemption component 402 to override such setting set by the configuration source. The exemption component 402 can log information indicative of the request. Moreover, the exemption component 402 may override the setting by turning the camera on based on the request.

Figure 5:
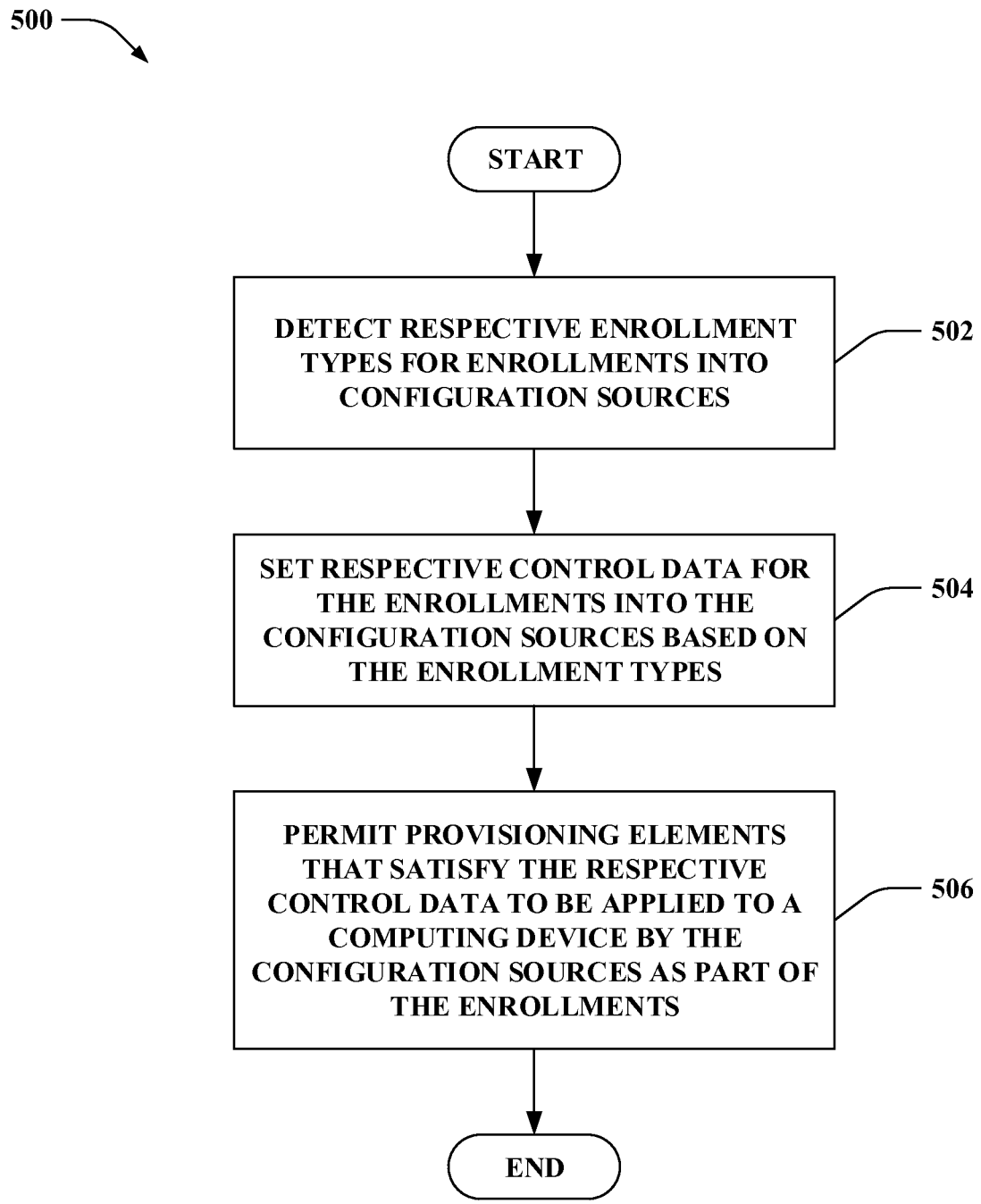
FIG. 5 is a flow diagram that illustrates an exemplary methodology of managing multiple enrollments of a computing device into configuration sources.
Figure 6:
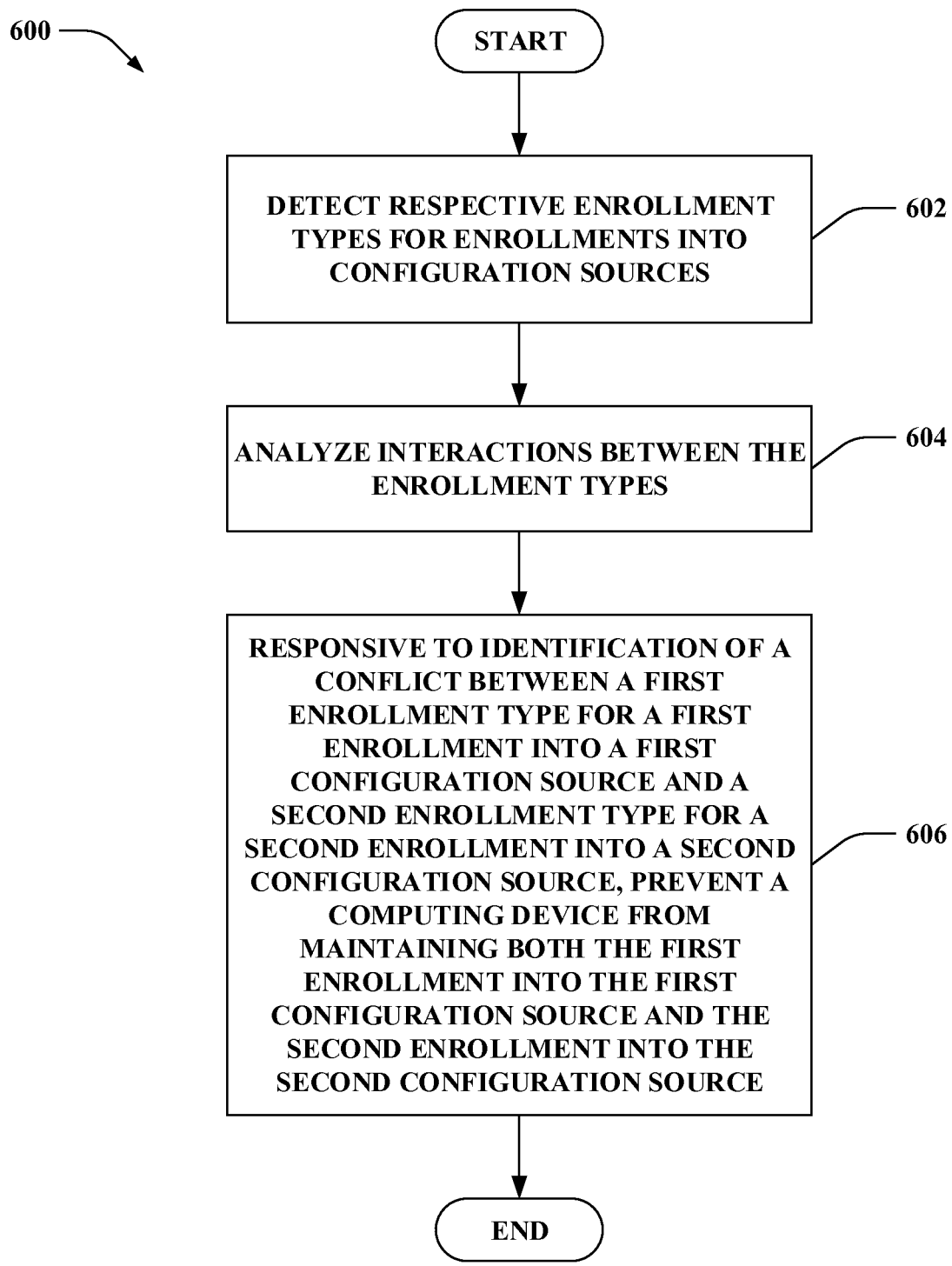
FIG. 6 is a flow diagram that illustrates another exemplary methodology of managing multiple enrollments of a computing device into configuration sources.
Figure 7:
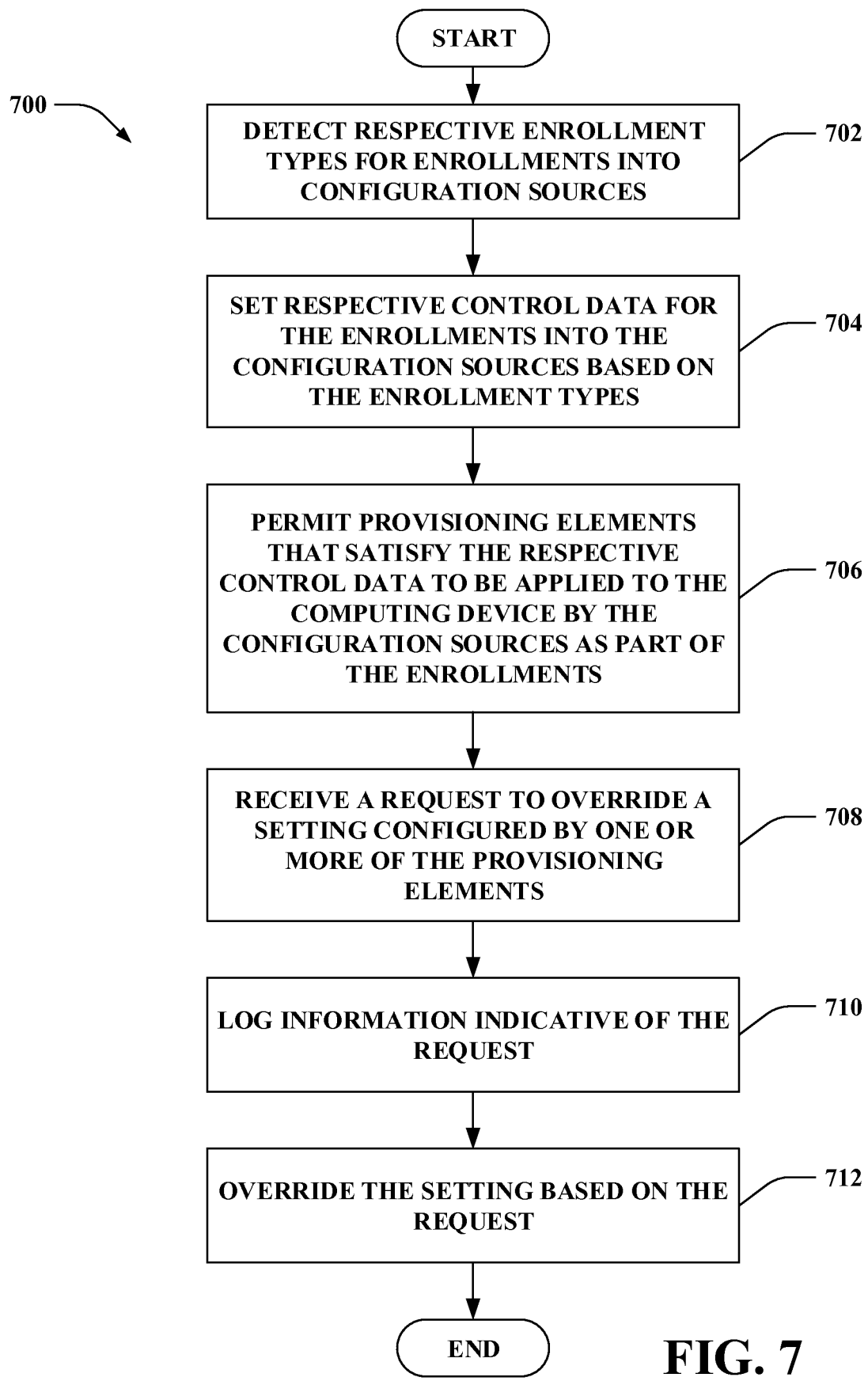
FIG. 7 is a flow diagram that illustrates another exemplary methodology of managing multiple enrollments of a computing device into configuration sources.

FIGS. 5-7 illustrate exemplary methodologies relating to enrolling a computing device into multiple configuration sources. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates a methodology 500 of managing multiple enrollments of a computing device into configuration sources. At 502, respective enrollment types for the enrollments into the configuration sources can be detected. At 504, respective control data for the enrollments into the configuration sources can be set based on the enrollment types. At 506, provisioning elements that satisfy the respective control data can be permitted to be applied to the computing device by the configuration sources as part of the enrollments. Moreover, disparate provisioning elements from the configuration sources that fail to satisfy the control data can be prevented from being applied as part of the enrollments.

With reference to FIG. 6, illustrated is a methodology 600 of managing multiple enrollments of a computing device into configuration sources. At 602, respective enrollment types for the enrollments into the configuration sources can be detected. At 604, interactions between the enrollment types can be analyzed. At 606, responsive to identification of a conflict between a first enrollment type for a first enrollment into a first configuration source and a second enrollment type for a second enrollment into a second configuration source, the computing device can be prevented from maintaining both the first enrollment into the first configuration source and the second enrollment into the second configuration source. For example, the computing device can be unenrolled from at least one of the first configuration source or the second configuration source. According to another example, the computing device can be prevented from establishing an enrollment into one of the first configuration source or the second configuration source responsive to the identification of the conflict.

Referring now to FIG. 7, illustrated is a methodology 700 of managing multiple enrollments of a computing device into configuration sources. At 702, respective enrollment types for the enrollments into the configuration sources can be detected. At 704, respective control data for the enrollments into the configuration sources can be set based on the enrollment types. At 706, provisioning elements that satisfy the respective control data can be permitted to be applied to the computing device by the configuration sources as part of the enrollments. At 708, a request to override a setting configured by one or more of the provisioning elements can be received. At 710, information indicative of the request can be logged. Further, the information indicative of the request can be transmitted to a server computing system. At 712, the setting can be overridden based on the request. The setting can automatically be overridden (e.g., responsive to receipt of the request) or overridden responsive to receipt of permission to override the setting, for example.

Figure 8:
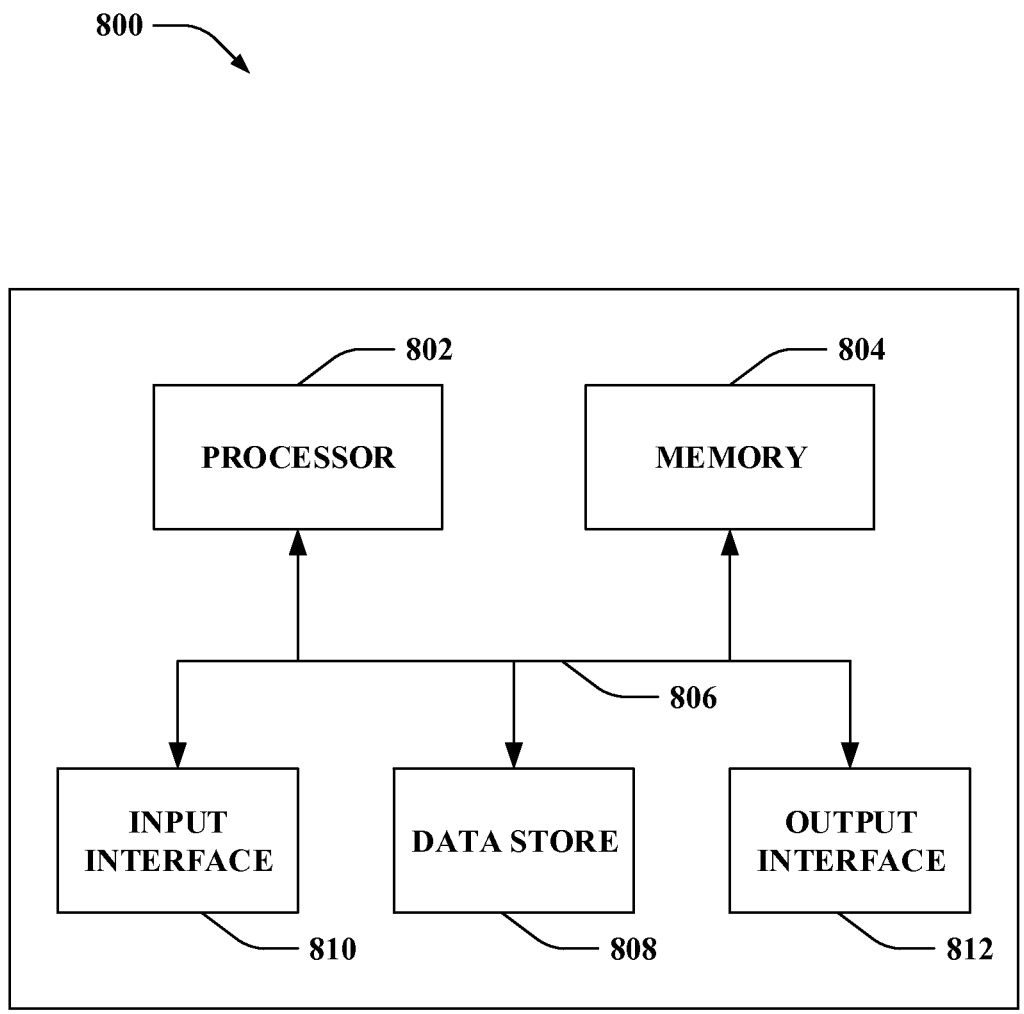
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be or include the computing device 102. According to another example, the computing device 102 may be or include the computing device 800. The computing device 800 includes at least one processor 802 that executes instructions that are stored in memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store control data, provisioning elements, provisioning package(s), and so forth.

The computing device 800 additionally includes a data store 808 that is accessible by the processor 802 by way of the system bus 806. The data store 808 may include executable instructions, provisioning elements, provisioning package(s), a settings journal, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various examples are now set forth.

EXAMPLE 1

A computing device, comprising: at least one processor; and memory comprising a centralized enrollment system that is configured to enroll the computing device into configuration sources, the centralized enrollment system being executable by the processor, the centralized enrollment system comprising: a classification component configured to detect a first enrollment type for a first enrollment into a first configuration source and a second enrollment type for a second enrollment into a second configuration source; a management component configured to set each of: first control data for the first enrollment into the first configuration source based at least on the first enrollment type, the computing device to be enrolled into the first configuration source using the first control data; and second control data for the second enrollment into the second configuration source based at least on the second enrollment type, the computing device to be enrolled into the second configuration source using the second control data; and an enforcement component configured to permit each of: first provisioning elements that satisfy the first control data to be applied to the computing device by the first configuration source as part of the first enrollment; and second provisioning elements that satisfy the second control data to be applied to the computing device by the second configuration source as part of the second enrollment.

EXAMPLE 2

The computing device according to Example 1, the enforcement component further configured to prevent each of: disparate first provisioning elements from the first configuration source that fail to satisfy the first control data from being applied as part of the first enrollment; and disparate second provisioning elements from the second configuration source that fail to satisfy the second control data from being applied as part of the second enrollment.

EXAMPLE 3

The computing device according to any of Examples 1-2, wherein: the first control data comprises a first scope for the first enrollment into the first configuration source, the first scope specifying first permissible provisioning elements allowed to be applied by the first configuration source as part of the first enrollment; and the second control data comprises a second scope for the second enrollment into the second configuration source, the second scope specifying second permissible provisioning elements allowed to be applied by the second configuration source as part of the second enrollment.

EXAMPLE 4

The computing device according to any of Examples 1-3, wherein: the first control data comprises first authorization data for the first enrollment into the first configuration source, the first authorization data specifying first access rights for the first configuration source as part of the first enrollment; and the second control data comprises second authorization data for the second enrollment into the second configuration source, the second authorization data specifying second access rights for the second configuration source as part of the second enrollment.

EXAMPLE 5

The computing device according to any of Examples 1-4, wherein: the first control data comprises first security data that specifies a first security protocol for the first enrollment into the first configuration source; and the second control data comprises second security data that specifies a second security protocol for the second enrollment into the second configuration source.

EXAMPLE 6

The computing device according to any of Examples 1-5, the first configuration source being a first mobile device management (MDM) server, the second configuration source being a second MDM server, and the first MDM server and the second MDM server being different servers.

EXAMPLE 7

The computing device according to any of Examples 1-5, at least one of the first configuration source or the second configuration source being a provisioning package executed by the at least one processor of the computing device.

EXAMPLE 8

The computing device according to any of Examples 1-7, further comprising: a data store configured to retain the first provisioning elements applied to the computing device by the first configuration source and the second provisioning elements applied to the computing device by the second configuration source, wherein the centralized enrollment system further comprises a trace component configured to track each of: the first provisioning elements to have been provisioned by the first configuration source; and the second provisioning elements to have been provisioned by the second configuration source.

EXAMPLE 9

The computing device according to Example 8, the centralized enrollment system further comprising a removal component configured to: unenroll the computing device from the first configuration source subsequent to the computing device being enrolled in the first configuration source; and remove, in response to unenrolling the computing device from the first configuration source, the first provisioning elements tracked to have been provisioned by the first configuration source from the data store.

EXAMPLE 10

The computing device according to any of Examples 1-9, the centralized enrollment system further comprising a resolution component configured to: detect conflicting provisioning elements applied by the first configuration source and the second configuration source; and merge the conflicting provisioning elements applied by the first configuration source and the second configuration source.

EXAMPLE 11

The computing device according to any of Examples 1-10, the centralized enrollment system further comprising a rules component configured to: identify, responsive to detection of a third enrollment type for a third enrollment into a third configuration source by the classification component, a conflict between the first enrollment type and the third enrollment type; and perform an action responsive to identification of the conflict, the action comprising at least one of triggering unenrollment of the computing device from the first configuration source or preventing the third enrollment into the third configuration source.

EXAMPLE 12

The computing device according to any of Examples 1-11, the centralized enrollment system further comprising a link component configured to link the first enrollment to the second enrollment, the first enrollment indicated as a parent enrollment and the second enrollment indicated as a child enrollment, and the link component triggering unenrollment of the computing device from the second configuration source in response to unenrollment of the computing device from the first configuration source.

EXAMPLE 13

The computing device according to any of Examples 1-12, the centralized enrollment system further comprising an exemption component configured to: receive a request to override a setting configured by one or more of the first provisioning elements or the second provisioning elements; log information indicative of the request; and override the setting based on to the request.

EXAMPLE 14

The computing device according to any of Examples 1-13, the centralized enrollment system further comprising a journaling component configured to: log settings pushed from the configuration sources in a settings journal; purge a subset of the settings configured by a particular one of the configuration sources from the settings journal in response to the computing device no longer being enrolled into the particular one of the configuration sources; and configure a state of the computing device based on a remainder of the settings in the settings journal.

EXAMPLE 15

A method of managing multiple enrollments of a computing device into configuration sources, comprising: detecting respective enrollment types for the enrollments into the configuration sources; analyzing interactions between the enrollment types; and responsive to identification of a conflict between a first enrollment type for a first enrollment into a first configuration source and a second enrollment type for a second enrollment into a second configuration source, preventing the computing device from maintaining both the first enrollment into the first configuration source and the second enrollment into the second configuration source.

EXAMPLE 16

The method according to Example 15, wherein the preventing further comprises unenrolling the computing device from at least one of the first configuration source or the second configuration source.

EXAMPLE 17

The method according to any of Examples 15-16, further comprising: setting respective control data for the enrollments into the configuration sources based on the enrollment types; permitting provisioning elements that satisfy the respective control data to be applied to the computing device by the configuration sources as part of the enrollments; and preventing disparate provisioning elements from the configuration sources that fail to satisfy the respective control data from being applied as part of the enrollments.

EXAMPLE 18

The method according to Example 17, further comprising: tracking each provisioning element applied to the computing device to a corresponding one of the configuration sources that provisioned the provisioning element.

EXAMPLE 19

A method of managing multiple enrollments of a computing device into configuration sources, comprising: detecting respective enrollment types for the enrollments into the configuration sources; setting respective control data for the enrollments into the configuration sources based on the enrollment types; permitting provisioning elements that satisfy the respective control data to be applied to the computing device by the configuration sources as part of the enrollments; receiving a request to override a setting configured by one or more of the provisioning elements; logging information indicative of the request; and overriding the setting based on the request.

EXAMPLE 20

The method according to Example 19, further comprising transmitting the information indicative of the request to a server computing system, the information indicative of the request comprising a user identifier, a justification for overriding the setting, and an identifier that specifies the setting.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:
1. A computing device, comprising:
at least one processor; and
memory that comprises computer-executable instructions that, when executed by the at least one processor, cause the at least one processor to perform acts including:
responsive to initiation of a first enrollment of the computing device into a first configuration source, detecting a first enrollment type for the first enrollment of the computing device into the first configuration source, wherein the first configuration source is one of a mobile device management (MDM) server, a messaging server, a classroom orchestration server, or a mobile operator;
setting first control data for the first enrollment of the computing device into the first configuration source based at least on the first enrollment type;
responsive to initiation of a second enrollment of the computing device into a second configuration source, detecting a second enrollment type for the second enrollment of the computing device into the second configuration source, wherein the second configuration source is one of an MDM server, a messaging server, a classroom orchestration server, or a mobile operator;
setting second control data for the second enrollment of the computing device into the second configuration source based at least on the second enrollment type, the computing device concurrently enrolled into the first configuration source and the second configuration source; and while the computing device is concurrently enrolled into the first configuration source and the second configuration source:
configuring the computing device to apply first provisioning elements received from the first configuration source that satisfy the first control data;
configuring the computing device to apply second provisioning elements received from the second configuration source that satisfy the second control data;
detecting conflicting provisioning elements received from the first configuration source and the second configuration source; and
merging the conflicting provisioning elements received from the first configuration source and the second configuration source.

2. The computing device of claim 1, the memory further comprising computer-executable instructions that, when executed by the at least one processor, cause the at least one processor to perform acts including:
while the computing device is concurrently enrolled into the first configuration source and the second configuration source, preventing each of:
disparate first provisioning elements from the first configuration source that fail to satisfy the first control data from being applied as part of the first enrollment; and
disparate second provisioning elements from the second configuration source that fail to satisfy the second control data from being applied as part of the second enrollment.

3. The computing device of claim 1, wherein:
the first control data comprises a first scope for the first enrollment into the first configuration source, the first scope specifying first permissible provisioning elements allowed to be applied as part of the first enrollment; and
the second control data comprises a second scope for the second enrollment into the second configuration source, the second scope specifying second permissible provisioning elements allowed to be applied as part of the second enrollment.

4. The computing device of claim 1, wherein:
the first control data comprises first authorization data for the first enrollment into the first configuration source, the first authorization data specifying first access rights for the first configuration source as part of the first enrollment; and
the second control data comprises second authorization data for the second enrollment into the second configuration source, the second authorization data specifying second access rights for the second configuration source as part of the second enrollment.

5. The computing device of claim 1, wherein:
the first control data comprises first security data that specifies a first security protocol for the first enrollment into the first configuration source; and
the second control data comprises second security data that specifies a second security protocol for the second enrollment into the second configuration source.

6. The computing device of claim 1, the first configuration source being a first MDM server, the second configuration source being a second MDM server, and the first MDM server and the second MDM server being different servers.

7. The computing device of claim 1, further comprising:
a data store configured to retain the first provisioning elements applied to the computing device as part of the first enrollment and the second provisioning elements applied to the computing device as part of the second enrollment;
wherein the memory further comprises computer-executable instructions that, when executed by the at least one processor, cause the at least one processor to perform acts including:
tracking each of:
the first provisioning elements to have been provisioned by the first configuration source; and
the second provisioning elements to have been provisioned by the second configuration source.

8. The computing device of claim 7, the memory further comprising computer-executable instructions that, when executed by the at least one processor, cause the at least one processor to perform acts including:
unenrolling the computing device from the first configuration source subsequent to the computing device being enrolled in the first configuration source; and
removing, in response to unenrolling the computing device from the first configuration source, the first provisioning elements tracked to have been provisioned by the first configuration source from the data store.

9. The computing device of claim 1, the memory further comprising computer-executable instructions that, when executed by the at least one processor, cause the at least one processor to perform acts including:
identifying, responsive to detection of a third enrollment type for a third enrollment of the computing device into a third configuration source, a conflict between the first enrollment type and the third enrollment type; and
performing an action responsive to identification of the conflict, the action comprising at least one of triggering unenrollment of the computing device from the first configuration source or preventing the third enrollment of the computing device into the third configuration source.

10. The computing device of claim 1, the memory further comprising computer-executable instructions that, when executed by the at least one processor, cause the at least one processor to perform acts including:
linking the first enrollment to the second enrollment, the first enrollment indicated as a parent enrollment and the second enrollment indicated as a child enrollment; and
triggering unenrollment of the computing device from the second configuration source in response to unenrollment of the computing device from the first configuration source.

11. The computing device of claim 1, the memory further comprising computer-executable instructions that, when executed by the at least one processor, cause the at least one processor to perform acts including:
receiving a request to override a setting configured by one or more of the first provisioning elements or the second provisioning elements;
logging information indicative of the request; and
overriding the setting based on the request.

12. The computing device of claim 1, the memory further comprising computer-executable instructions that, when executed by the at least one processor, cause the at least one processor to perform acts including:

logging, in a settings journal, settings pushed from configuration sources in which the computing device is enrolled;

purging a subset of the settings configured by a particular one of the configuration sources from the settings journal in response to the computing device no longer being enrolled into the particular one of the configuration sources; and configuring a state of the computing device based on a remainder of the settings in the settings journal.

13. A method of managing multiple enrollments of a computing device, comprising:

detecting respective enrollment types for the enrollments of the computing device into a plurality of configuration sources;

analyzing interactions between the enrollment types; and responsive to identification of a conflict between a first provisioning element of a first enrollment type for a first enrollment of the computing device into a first configuration source and a second provisioning element of a second enrollment type for a second enrollment of the computing device into a second configuration source, merging the first provisioning element and the second provisioning element.

14. The method of claim 13, further comprising:

unenrolling the computing device from at least one of the first configuration source or the second configuration source.

15. The method of claim 13, further comprising:

setting respective control data for the enrollments of the computing device into the configuration sources based on the enrollment types;

configuring the computing device to apply provisioning elements that satisfy the respective control data and preventing disparate provisioning elements from the configuration sources that fail to satisfy the respective control data from being applied as part of the enrollments.

16. The method of claim 15, further comprising:

tracking each provisioning element applied by the computing device to a corresponding one of the configuration sources that provisioned the provisioning element.

17. A method of managing multiple enrollments of a computing device, comprising:

detecting respective enrollment types for the enrollments of the computing device into a plurality of configuration sources, wherein each of the configuration sources in the plurality is one of a mobile device management (MDM) server, a messaging server, a classroom orchestration server, or a mobile operator;

setting respective control data for the enrollments of the computing device into the plurality of the configuration sources based on the enrollment types, the computing device being concurrently enrolled into the plurality of the configuration sources;

configuring the computing device to apply provisioning elements that satisfy the respective control data for the enrollments of the computing device into the plurality of the configuration source;

detecting conflicting provisioning elements received from the plurality of configuration sources:

merging the conflicting provisioning elements;

receiving a request to override a setting configured by one or more of the provisioning elements;

logging information indicative of the request; and overriding the setting based on the request.

18. The method of claim 17, further comprising transmitting the information indicative of the request to a server computing system, the information indicative of the request comprising a user identifier, a justification for overriding the setting, and an identifier that specifies the setting.

19. The method of claim 13, wherein each of the configuration sources in the plurality is one of a mobile device management (MDM) server, a messaging server, a classroom orchestration server, or a mobile operator.

20. The method of claim 17, wherein an enrollment type for an enrollment into a configuration source in the plurality of configuration sources is one of:

full enrollment;

light enrollment; or on-device enrollment.

* * * * *